United States Patent

Smith

[11] Patent Number: 6,041,866
[45] Date of Patent: Mar. 28, 2000

[54] ROCK PICKER

[76] Inventor: Earl R. Smith, 2409 W. Jordan Rd., Mt. Pleasant, Mich. 48858

[21] Appl. No.: 09/148,342

[22] Filed: Sep. 4, 1998

[51] Int. Cl.[7] .................................................. A01B 43/00
[52] U.S. Cl. .......................... 171/63; 171/136; 171/141; 171/144; 37/303
[58] Field of Search .............................. 171/63, 64, 65, 171/82, 109, 124, 136, 140, 141, 143, 144; 37/301, 302, 303; 172/781, 811; 56/327.1, 328.1, 344

[56] References Cited

U.S. PATENT DOCUMENTS

| | | |
|---|---|---|
| 2,491,079 | 12/1949 | Bestland . |
| 2,618,917 | 11/1952 | Howser . |
| 2,636,328 | 4/1953 | Jochim . |
| 2,895,557 | 7/1959 | Davis . |
| 3,082,828 | 3/1963 | Schindelka ................................ 171/63 |
| 3,356,158 | 12/1967 | Deaver et al. ............................ 171/63 |
| 3,392,790 | 7/1968 | Bestland et al. .......................... 171/63 |
| 3,643,821 | 2/1972 | Viel ...................................... 171/63 X |
| 4,040,489 | 8/1977 | Hulicsko .................................. 171/63 |
| 4,044,480 | 8/1977 | Stedman . |
| 4,296,818 | 10/1981 | Malinowski et al. ..................... 171/63 |
| 4,301,869 | 11/1981 | Dubois . |
| 5,027,906 | 7/1991 | Jeannotte et al. . |

OTHER PUBLICATIONS

Rock–Master Rock Removal Equipment, High–Line Mfg. Inc. brochure, 4 pages, Copyright 1993.

Degelman Industries Ltd. "Best in the Field . . . Where it Counts" Specifications, printed in Canada by Commercial Printers Limited (1 sheet back and front).

Haybuster Manufacturing, Inc. brochure Haybuster Rock–eze Combination windrower and rockpiler (1 sheet back and front).

Schulte WR5 Rock Windrower brochure Printed in Canada, Part No. 1000–101 (1 sheet front and back).

DuraTech H–106 Rockeze Rock Picker brochure Printed in U.S. 3M496, (1 sheet front and back).

Primary Examiner—Victor Batson
Attorney, Agent, or Firm—Reising, Ethington, Barnes, Kisselle, Learman & McCulloch P.C.

[57] ABSTRACT

A rock picker having a frame supported by rear support wheels and a tongue that is adapted to be attached to a tractor draw bar. A basket assembly having gathering tines and separation bars is carried by the frame. The gathering tines gather rocks and hold the rocks while allowing soil to pass between adjacent tines. The basket assembly is pivotally attached to short links. The short links are pivotally attached to the frame. Hydraulic cylinders are attached to the frame and to the basket assembly. When the basket assembly is filled with rocks, the hydraulic cylinders are extended. Initially, the short links pivot forward, lowering and extending the forward ends of the gathering tines and placing a downward force on the gathering tines. Continuing extension of the hydraulic cylinder raises the gathering tines and causes rocks to slide down the separation bars and into a rock hopper. Dirt passes between the separation bars and to the ground. The cylinders are retracted to return the basket assembly to a rock gathering position. The rock hopper is dumped in a rock storage area when it is filled.

23 Claims, 6 Drawing Sheets

ROCK PICKER

TECHNICAL FIELD

This invention relates to a machine for removing rocks from farm fields and more particularly to a machine pulled by a tractor which gathers rocks, intermittently transfers gathered rocks to a rock hopper, and dumps rocks from the rock hopper in a rock storage area.

BACKGROUND OF THE INVENTION

Farm fields in many areas have rocks mixed with the soil. These rocks interfere with growing plants, damage tillage tools, and damage harvesting machinery. The damage to harvesting machinery can be very expensive and takes substantial periods of time to repair.

Rocks are found in all shapes and sizes. Rocks that are less than about 1.5 inches in diameter cause minimal damage and are generally left in the field. Larger rocks are generally removed periodically.

Freezing and thawing of the ground tends to force rocks to the surface. This results in additional rocks appearing near the surface every year. The quantity of rocks on the surface of the fields varies considerably from one area to another and even from one part of a field to another part of the field.

Mechanical rock pickers have been available for some years. These machines generally handle rocks that are up to about 2 feet in diameter. In areas where the quantity of rocks to be removed is large, rock pickers with a conveyor assembly that continuously moves rocks into a rock hopper are employed. The conveyor assemblies increase the cost of manufacturing as well as the operating costs of these rock pickers. However, continuous conveyors permit these rock pickers to operate continuously until the hopper is full. This continuous operation permits rocks to be picked from a substantial area per hour. In fields where the quantity of rocks to be removed is relatively small, rock pickers are employed that gather rocks in a basket, stop to transfer rocks from the basket to the hopper, and then resume gathering rocks. Elimination of the continuous conveyor reduces manufacturing and operating costs. However, stopping to transfer gathered rocks to the rock hopper takes time and slows the operation. In fields where the quantity of rocks to be removed is low or moderate, rocks can be removed from a substantial area per hour, even though no rocks are removed during the period the machine is stopped to transfer rocks to the rock hopper.

The additional cost of removing rocks with a rock picker with a continuous conveyor is justified only where there is a large quantity of rocks and a large acreage of land to be cleared of rocks.

The rock pickers, that gather the rocks and then stop to transfer the rocks to the rock hopper, tend to drop a few rocks off the tips of the rock gathering tines when the machine is stopped and the gathered rocks are raised and deposited in a hopper on a rock picker. The machine then has to gather these dropped rocks and start with a partially loaded basket assembly when gathering of rocks is resumed.

SUMMARY OF THE INVENTION

An object of the invention is to provide a rock picker that lowers the tips of the gathering tines at the start of movement of the basket assembly from a rock gathering position to a rock discharge position. Another object of the invention is to provide a rock picker that urges the tips of the rock gathering tines downwards at the start of movement of the basket assembly from a rock gathering position to a rock discharge position. A further object of the invention is to provide a rock picker with a basket assembly that is held in a fixed position relative to the frame when the rock gathering tines of the basket assembly are in a rock gathering position.

The rock picker has a frame supported by wheels and a tongue that is attached to a tractor when picking rocks. A rock hopper is pivotally attached to the frame. Hydraulic cylinders attached to the rock hopper pivot the rock hopper to and from a rock discharge position.

A basket assembly is provided that has a plurality of rock gathering tines and a grate assembly. A pair of short links, each having a first end pivotally secured to the frame and a second end pivotally secured to the basket assembly, limit movement of the basket assembly relative to the frame. Hydraulic cylinders, attached to the frame and the basket assembly, are extended to pivot the basket assembly to a rock discharge position and retracted to pivot the basket assembly to a rock gathering position.

Movement of the basket assembly is controlled by a four bar linkage. The short link forms one of the bars, the frame forms a bar, the hydraulic cylinders form a bar with a variable length, and the basket assembly forms a bar. When the hydraulic cylinder is retracted, the basket assembly is moved toward a rock gathering position, a stop surface on the basket assembly is lifted above a basket support surface on the frame, and a first stop surface on the short link contacts the frame and the basket assembly is fixed relative to the frame.

Initial extension of the hydraulic cylinders releases the short link to pivot forward and downward relative to the frame about pivot pins thereby moving the upper portion of the basket assembly forward, moving the forward ends of the rock gathering tines downward relative to their rear anchor ends and urges the rock gathering tines downward. The short links pivot about the pivot pins until the second stop surfaces on the short links contact the frame and a stop surface on the basket assembly may contact the basket support surface on the frame. Continued extension of the cylinders pivots the basket assembly to a rock discharge position.

When the rock hopper is full, the rock picker is moved to a rock storage area and rocks are discharged from the rock hopper.

A second embodiment of the invention has hydraulic cylinders connected to the basket assembly and to the short links. In this embodiment, the cylinders control the position of the short links directly.

DESCRIPTION OF THE DRAWINGS

The presently preferred embodiment of the invention is disclosed in the following description and in the accompanying drawings, wherein.

DETAILED DESCRIPTION OF THE PREFERRED EMBODIMENT

The rock picker 10 has a frame assembly 12, a rock hopper 15 and a basket assembly 14. Frame assembly 12 has a left side horizontal beam 16, a right side horizontal beam 18, a forward transverse beam 20 and a rear transverse beam 22. The rear transverse beam 22 is connected to the left side horizontal beam 16 and the right side horizontal beam 18 by tower assemblies 24 that raise the rear transverse beam relative to the side horizontal beams 16 and 18. Rear support wheels 26 are attached to the rear transverse beam 22 by wheel support arms 28 that are welded to the transverse beam. A tongue 30 is secured to the left side horizontal beam 16 and extends forwardly and to the left relative to the left side horizontal beam 16. A hitch plate 32 is attached to the forward end of the tongue 30 for attaching the rock picker to the draw bar 33 of a tractor. The hitch plate 32 is vertically adjustable relative to the tongue 30 to accommodate different height tractor draw bars 33. The tongue 30 extends to the left side of the rock picker 10 so that rocks are picked up on the right side of the tractor where they have not been forced down into the ground by the tractor tires. Tongues 30 of implements may be provided with a vertical axis pivot so that the implement can be transported on the road directly behind the tractor.

The rock hopper 15 has a rear wall 34, two side walls 36, a front wall 38 and a bottom wall 40. Open slots 42 are provided in the front wall 38 and the bottom wall 40 to allow soil mixed with the rocks to fall out and onto the ground. Open slots 42 may also be provided in the rear wall 34. Two vertical hopper support masts 44 and 46 are secured to the left and right horizontal beams 16 and 18 of the frame assembly 12 to the rear of the rear transverse beam 22. The upper edge 48 of the rear wall 34 is pivotally attached to the top of the hopper support masts 44 and 46 by pivot pins 52. Two hydraulic cylinders 56 are each pivotally attached to one of the hopper support masts 44 or 46 and to one of the side walls 36 of the rock hopper 15. These hydraulic cylinders 56 pivot the rock hopper 15 about the axis of the pivot pins 52 in one direction to discharge rocks. Hydraulic cylinders 56 are retracted to pivot the rock hopper 15 to a position in which a portion of the bottom wall 40 sits on the frame assembly 12 and the hopper is in a position to receive rocks.

The basket assembly 14 has a left side plate 58, a right side plate 60, a gathering tine assembly 62, and a grate assembly 64. The side plates 58 and 60 are parallel to each other and spaced apart. The gathering tine assembly 64 includes a tine cross bar 66 secured to a lower end of each of the side plates 58 and 60. A plurality of parallel spaced apart rock gathering tines 68 have their anchor ends 70 secured to the tine cross bar 66. The forward pointed ends 72 of the tines 68 are spaced from the tine cross bar 66 so that soil can pass between the tines at the same time the tines hold rocks that the pointed ends 72 pass under.

The grate assembly 64 includes a series of transverse cross bars 74 that are attached to the side plates 58 and 60. These cross bars 74 are parallel to each other and to the tine cross bar 66. A plurality of parallel spaced apart separation bars 76 are attached to the cross bars 74. These separation bars 76 are parallel to the rock gathering tines 68 and have receiving ends 78, adjacent to the rock gathering tines 68, and discharge ends 80.

Figure 1:
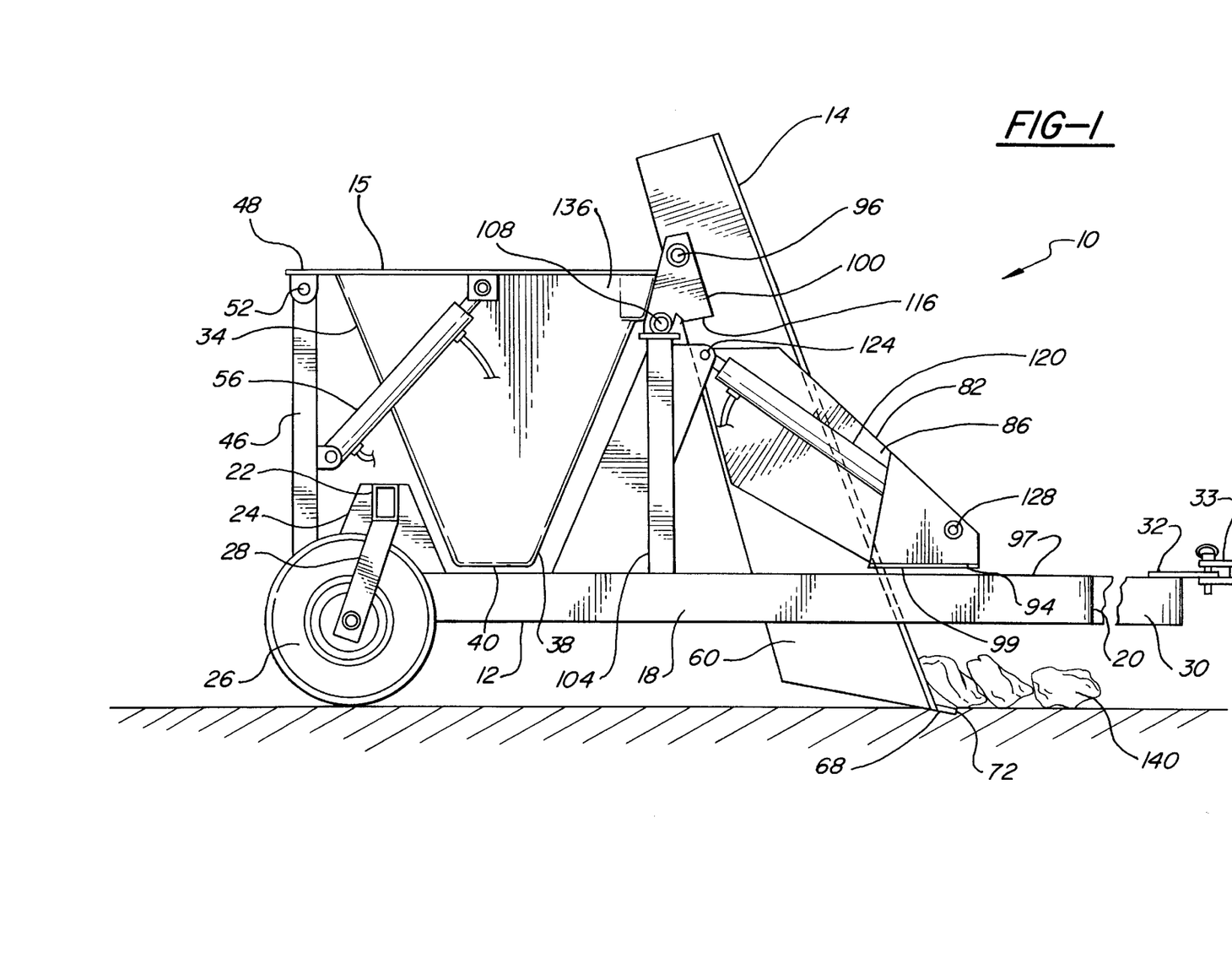
FIG. 1 is a side elevational view of the rock picker with the basket assembly in a rock picking position.

A yoke assembly 82 is attached to the side plates 58 and 60 about midway between their upper and lower ends. The yoke assembly 82 includes a left yoke side plate 84, a right yoke side plate 86 and a transverse yoke member 90. The transverse yoke member 90 extends from the forward end of the side plate 84 to the forward end of the side plate 86. The left yoke side plate 84 is attached to the left side plate 58 of the basket assembly 14, to one of the transverse cross bars 74 and extends forwardly from the basket assembly left side plate. The right yoke side plate 86 is attached to the right side plate 60 of the basket assembly 14, to one of the transverse cross bars 74 and extends forwardly from the basket assembly right side plate. A transverse yoke member 90 is attached to the forward ends of the left and right yoke side plates 84 and 86. Basket stop surfaces 94 are provided on the forward end of the yoke 82. These basket stop surfaces 94 are lifted to positions above the basket support surfaces 95 and 97 on the frame assembly 12 when the basket assembly 14 is in position to gather rocks as shown in FIG. 1.

A mounting shaft 96 passes through the left and right side plates 58 and 60 of the basket assembly 14 below and to the rear of the grate assembly 64. The mounting shaft 96 is secured to the side plates 58 and 60 adjacent to the discharge ends 80 of the separation bars 76.

Short links 98 and 100 are pivotally mounted to the mounting shaft 96. The short links 98 and 100 are also pivotally attached to vertical masts 102 and 104 on the frame assembly 12 by pivot pins 108. Stop surfaces 112 on the short links 98 and 100 contact the vertical mast 102 and 104 to limit pivotal movement of the short links 98 and 100 in a first direction. Stop surfaces 116 on the short links 98 and 100 contact the vertical mast 102 and 104 to limit pivotal movement of the short links 98 and 100 in another direction.

Hydraulic cylinders 118 and 120 have their rod ends pivotally secured to the vertical mast 102 and 104 below and forward of the pins 108 by pins 122 and 124. The head ends of the hydraulic cylinders 118 and 120 are attached to the yoke assembly 82 adjacent the transverse member 90 by pivot pins 126 and 128. The connection between the frame assembly 12 and the basket assembly 14 is a four bar linkage with the vertical masts 102 and 104 forming one link, the short links 98 and 100 forming a link, basket assembly 14 forming a link and the hydraulic cylinders 118 and 120 forming a link. Retraction of the hydraulic cylinders 118 and 120 lowers the rock gathering tines 68 to the ground, slides the rock gathering tines to the rear on the ground or on the basket support surfaces 95 and 97, moves the stop surface 112 on the short links 98 and 100 into contact with the vertical masts 102 and 104, positions the basket stop surfaces 94 above the basket support surfaces 95 and 97, and holds the basket assembly 14 in a fixed position relative to the frame assembly 12.

Extension of the hydraulic cylinders 118 and 120 first frees the stop surfaces 112 on the short links 98 and 100 to move from contact with the frame 12. When the basket assembly 14 is loaded with rocks, the weight of the rocks in the basket will tend to hold the lower end of the basket assembly in a generally fixed position. Continued extension of the hydraulic cylinders will pivot the short links 98, 100 until the second stop surfaces 116 contact the vertical mast 102 and 104 of the frame assembly 12 and limit pivotal movement of the short links. This movement rotates the upper end portion of the basket assembly 14 forward relative to the gathering tine assembly 62. Forward movement of the upper portion of the basket assembly 14 tends to lower the forward ends 72 of the rock gathering tines 68 and transfer weight of the basket assembly to the rock gathering tines. If the ground is relatively soft, the basket stop surfaces 94 move into contact with basket support surfaces 95 and 97 on the frame 12. Contact between the basket stop surfaces 94 and the basket support surfaces 95 and 97 limits downward movement of the tines 68. The basket support surfaces 95 and 97 can have wear plates attached for the stop surfaces 94 to slide on if desired. A pair of skid shoes 99 can be attached to the yoke assembly 82 that slide on basket support surfaces 95 and 97, if desired. Continued expansion of the hydraulic cylinders 118 and 120 moves the rock gathering tines 68 forward in the ground and then lifts the basket assembly 14 to a rock discharge position. Upon the basket assembly 14 clearing the ground, the short links 98 and 100 will tend to move toward positions in which a line through the axis of the pins 96 and 108 passes through the axis of the pivot pins 126 and 128. The weight of rocks 140 in the basket assembly 14 will, however, hold the axis of the mounting shaft 96 above a line through the axis of pins 108 and pins 126 and 128.

Rocks 140 slide down the separation bars 76 and into the rock hopper 15 upon the basket assembly 14 being raised sufficiently. Loose soil mixed with the rocks passes between the separation bars 76 and to the ground. The hydraulic cylinders 118 and 120 are retracted to return the basket assembly 14 to a rock gathering position after rocks are deposited in the rock hopper 15. As soon as the basket assembly 14 is held in a fixed position, forward movement of the rock picker 10 can resume.

Figure 1A:
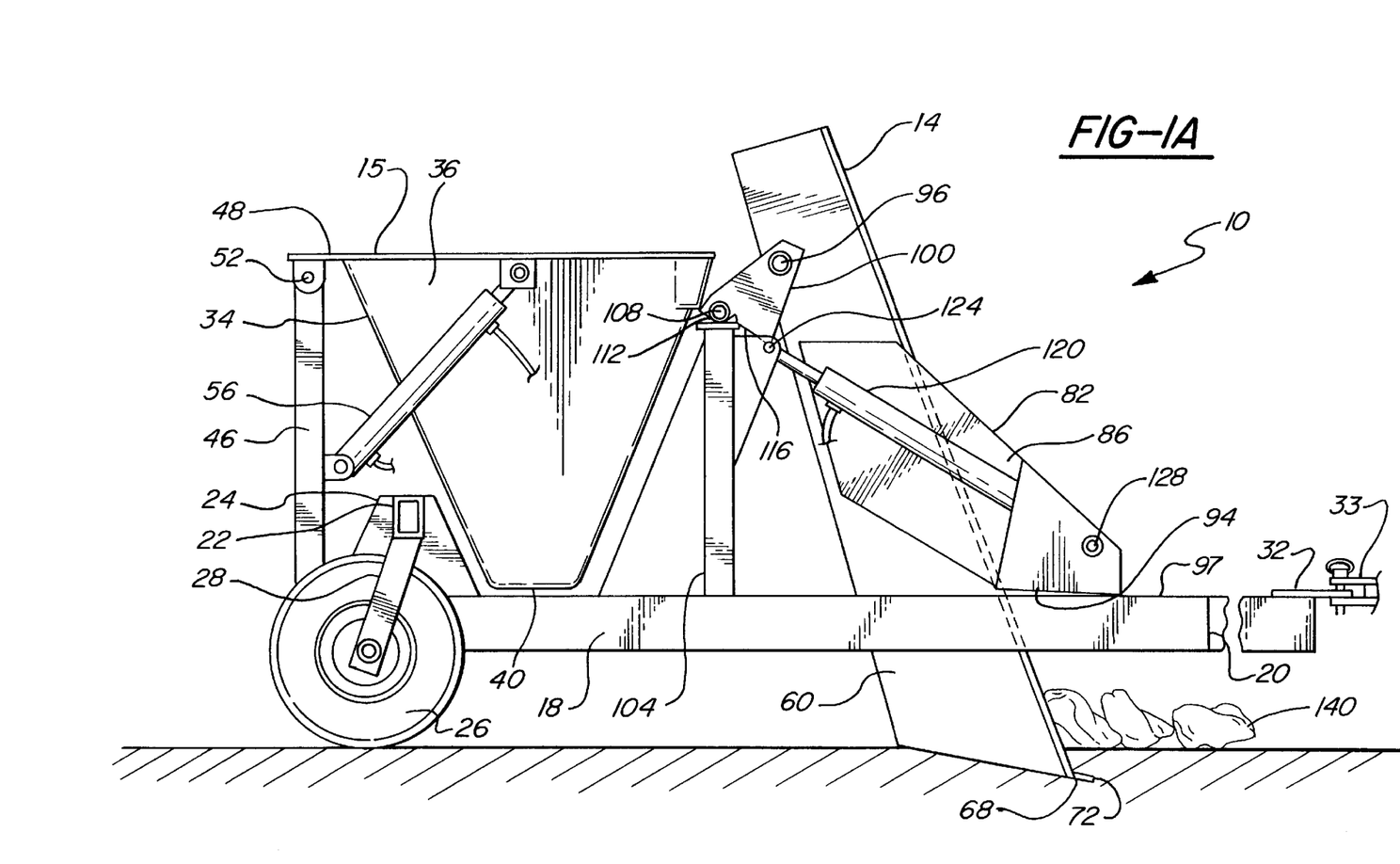
FIG. 1A is a side elevational view of the rock picker after the hydraulic cylinders start to extend to dump rocks into the rock hopper.
Figure 2:
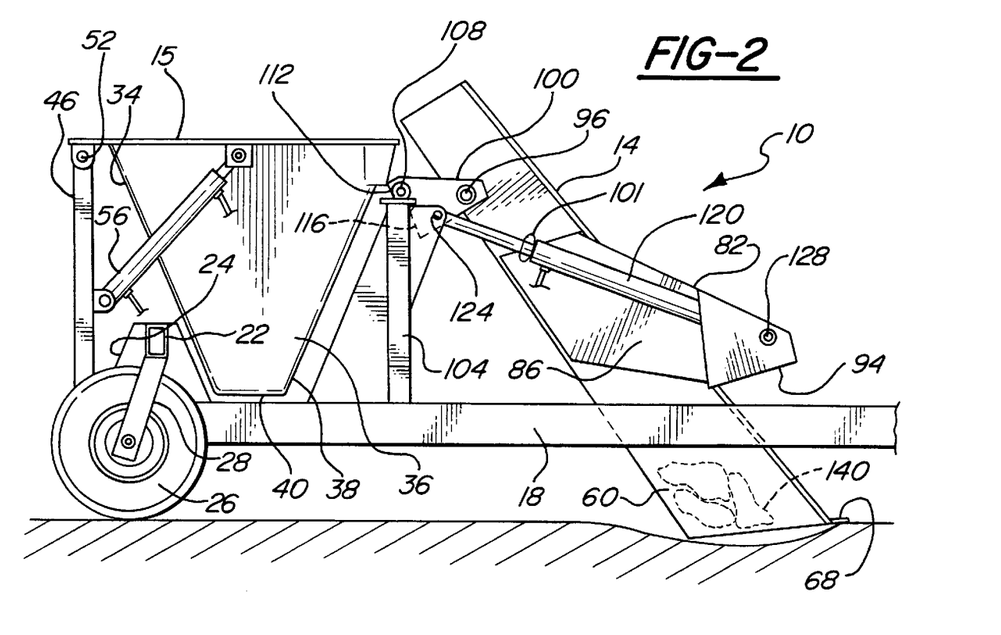
FIG. 2 is a reduced side elevational view of the rock picker with a basket assembly starting to clear the ground.
Figure 3:
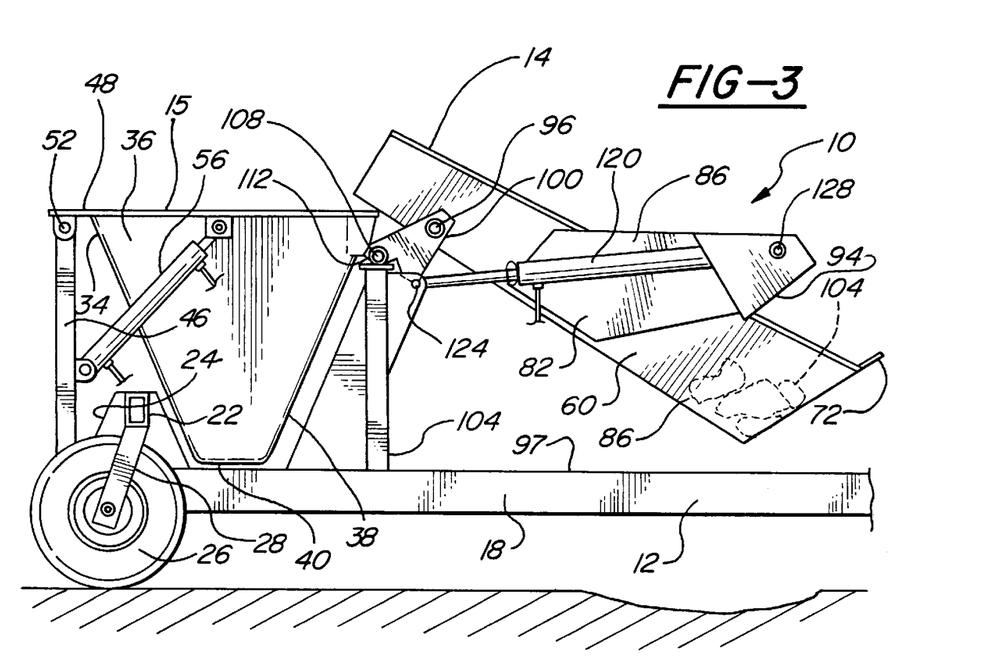
FIG. 3 is a reduced side elevational view of the rock picker with a basket assembly loaded with rocks and well above the ground.
Figure 4:
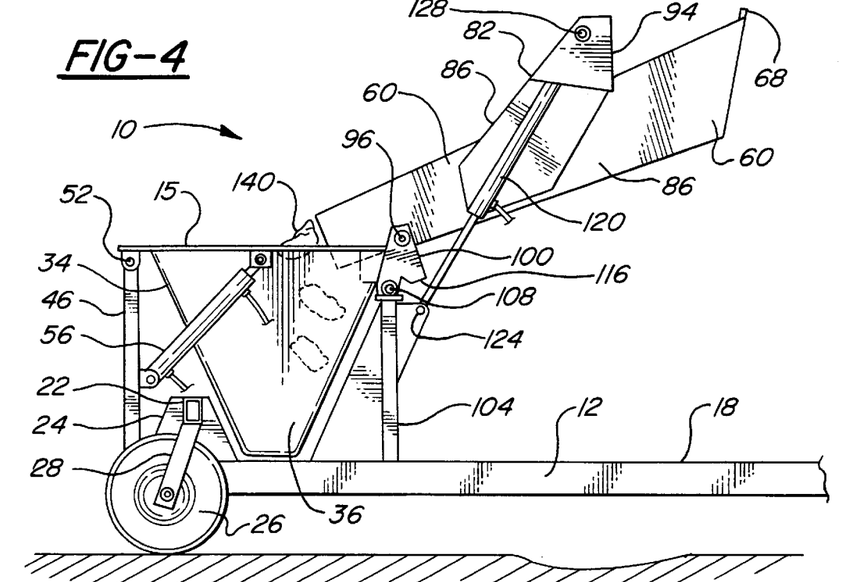
FIG. 4 is a reduced side elevational view of the rock picker with a basket assembly in a position to dump rocks into the rock hopper.
Figure 5:
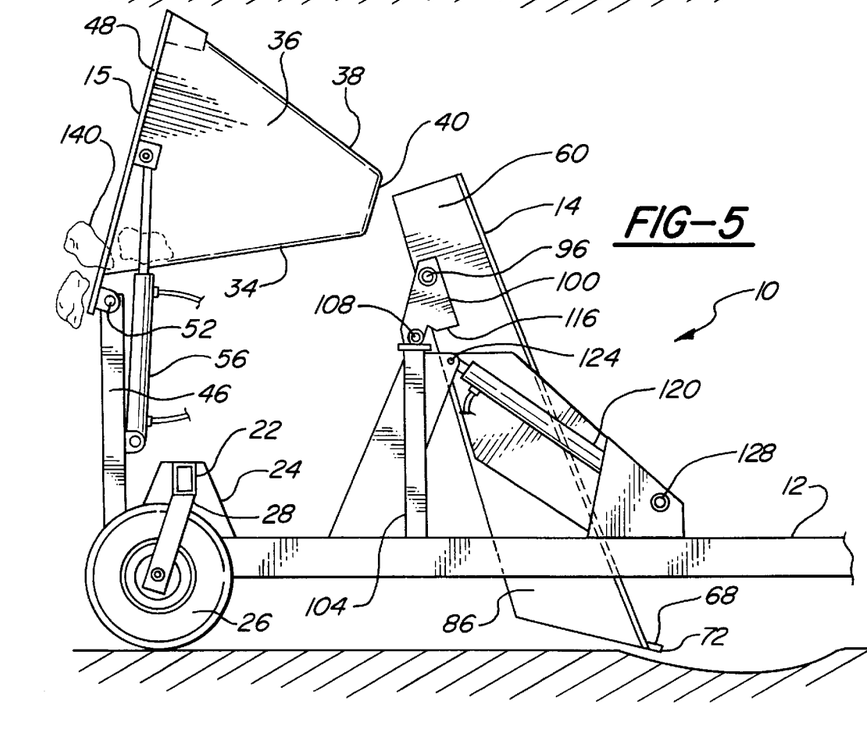
FIG. 5 is a reduced side elevational view of the rock picker with rocks being dumped from the rock hopper.
Figure 6:
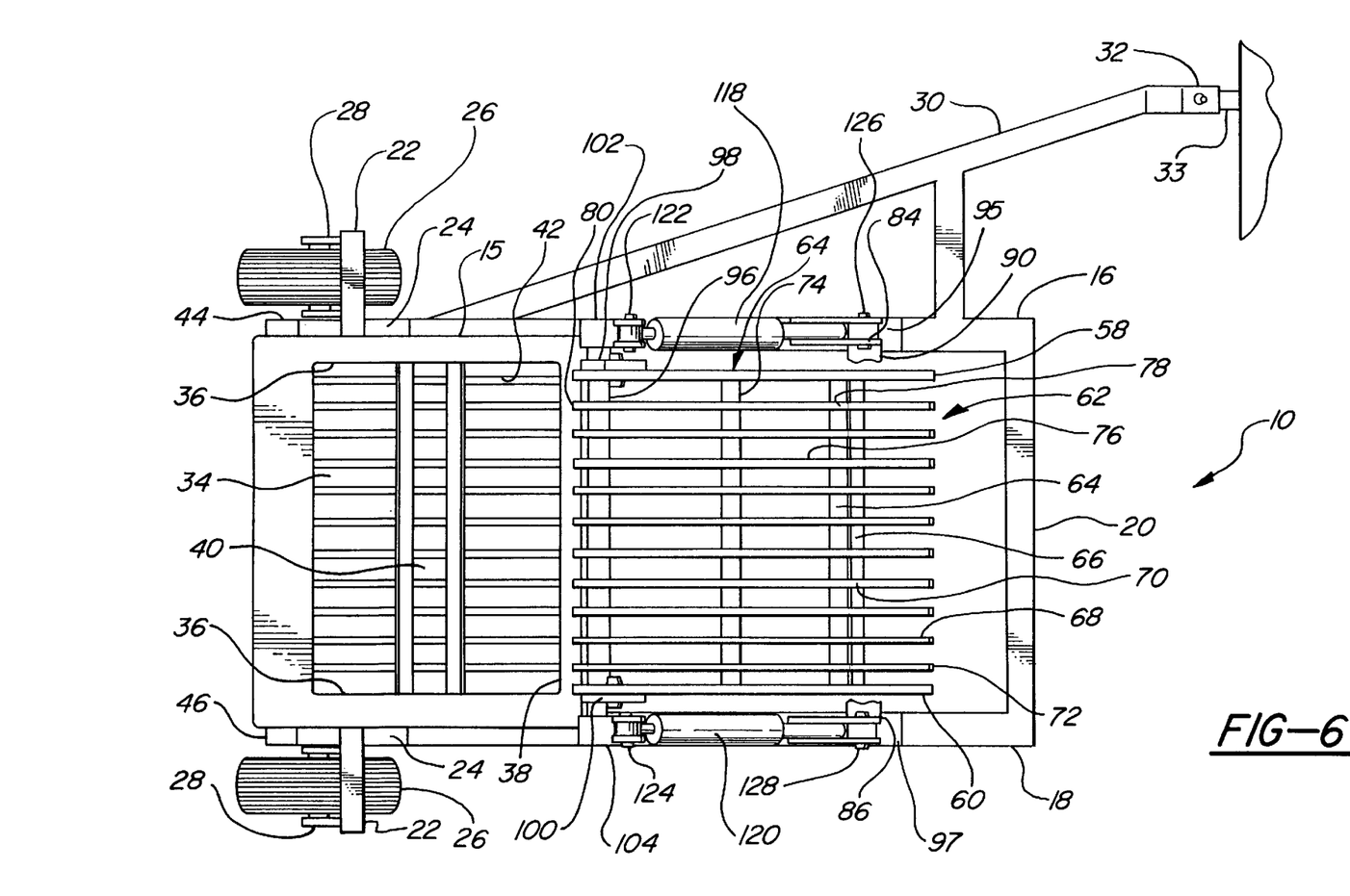
FIG. 6 is a plan view of the rock picker with parts broken away.

The basket assembly 14 is supported by the hydraulic cylinders 118 and 120, with the basket stop surfaces 94 above the basket support surfaces 95 and 97, when the basket assembly is in the rock picking position as explained above. Skid shoes 99 or wear plates, described above, are optional members that can be added to reduce wear and to cushion contact between the basket assembly 14 and the frame 12. When wear plates or skid shoes 99 are used, the basket assembly 14 is still raised some distance from contact with the frame 12. The depth of the forward ends 72 of the tines 68 during rock picking operations can be adjusted by changing the height of the forward end of the tongue 30 or by changing the piston stop rings 101 shown in FIG. 2. These stop rings 101, which limit the stroke of piston rods of hydraulic cylinders are commonly used to set the working depth of agricultural implements. Rotation of the short links 98 and 100, from the position shown in FIG. 1 to the position shown in FIG. 1A upon initial extension of the hydraulic cylinders 118 and 120, allows the short links 98 and 100 to pivot about the axis of the pins 108. This pivotal movement moves the mounting shaft 96 forward as explained above. The pivotal movement of the short links 98 and 100 due to extension of the cylinders 118 and 120 also tends to lower the basket assembly. The initial lowering of the basket assembly 14 will normally lower the forward ends 72 of the gathering tines 68 and transfer weight of the basket assembly from the frame 12 through the tines 68 to the ground. If the ground is very soft, the basket assembly may move downward until the basket stop surfaces 94 contact the frame 12. Normally the ground will initially support the basket assembly 14 with the basket stop surfaces 94 above the basket support surfaces 95 and 97. Continued extension of the hydraulic cylinders 118 and 120 will move the rock gathering tines 68 forward and downward until the basket stop surfaces 94 contact the frame 12. In very hard and compact soils, the tines 68 may slide on the soil and hold the stop surface 94 out of contact with the frame 12. Continued extension of the hydraulic cylinders 118 and 120 will raise the basket assembly from the ground and eventually discharge rocks into the rock hopper 15.

Retraction of the hydraulic cylinders 118 and 120, after rocks are discharged into the rock hopper 15, will normally move the tines 68 into contact with the ground, slide the tines along the ground, and then secure the basket assembly in a fixed position with the basket stop surfaces 94 above the basket support surfaces 95 and 97. The basket stop surfaces 94 may or may not contact the basket support surfaces 95 and 97 before the hydraulic cylinders 118 and 120 are fully retracted and hold the stop surfaces above the basket support surfaces. The hydraulic cylinders 118 and 120 are fully retracted when the piston contacts the bottom of the cylinder or when stop rings 101 block further retraction of the cylinder rod.

Figure 7:
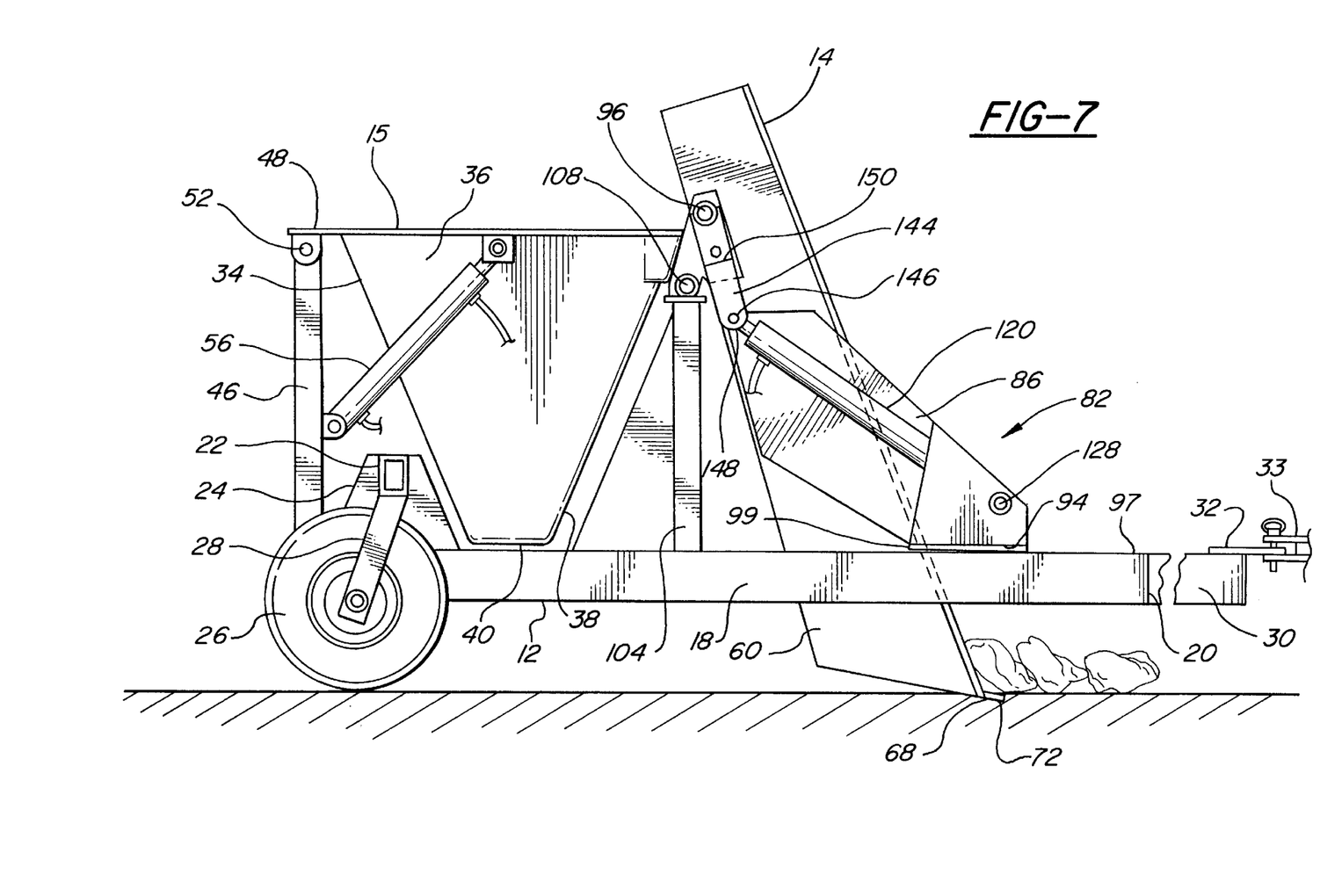
FIG. 7 is a reduced side elevational view of a modified version of the rock picker.

The rock picker 142, as shown in FIG. 7, is identical to the rock picker 10 shown in FIGS. 1–6 except for the connection of the hydraulic cylinders 118 and 120. The reference numbers used above are used in FIG. 7 where the parts are identical. The rock picker 142 has an arm 144 secured to the short link 100 and an arm 144 secured to the short link 98. The hydraulic cylinders 118 and 120 have the rod ends pivotally attached to the arms 144 by pins 146. The connections of the cylinders 118 and 120 to the vertical mast 102 and 104 by pins 122 and 124 are eliminated. The vertical mast 102 and 104 are moved laterally inward to provide clearance for the cylinders 118 and 120 and the pins 146 as well as the ends 148 of the arms 144. The arms 144 also have a lateral offset 150 to provide clearance for the pins 146.

The connection of the hydraulic cylinders 118 and 120 to the short links 98 and 100 with the pivot pins 108 between the pivot pins 146 and the mounting shaft 96 provide positive positioning of the short links. Retraction of the cylinders 118 and 120 moves the stop surfaces 112 into contact with the vertical mast 102 and 104 after the skid shoes 99 contact basket support surfaces 95 and 97 on the frame 12 or after the rock gathering tines 68 contact the ground and support the basket assembly 14. Initial extension of the cylinders 118 and 120 rotates the second stop surfaces 116 on the short links 98 and 100 about the axis of pivot pins 108 and into contact with the vertical mast 102 and 104. This pivotal movement of the short links 98 and 100 lowers the forward ends of the tines 68 and transfers weight to the tines as explained above in connection with the embodiment of FIGS. 1–6. Further extension of the cylinders 118 and 120 pivots the tines 68 forward and upward about the axis of the mounting shaft 96 and dumps rocks 140 into the rock hopper 15. The basket assembly 14 is free to pivot upward from a rock gathering position about the axis of the pivot pins 108 if the rock picker 10 moves to the rear.

The depth of the rock gathering tines 68, in the embodiment of FIG. 7, is controlled primarily by the skid shoes 99. The working depth of the tines 68 can be adjusted by changing the skid shoes 99 to skid shoes with a different vertical dimension or thickness. The depth of the tines 68 can also be changed by changing the height of the tongue 30 as explained above.

The hydraulic cylinders 118 and 120 do not provide primary support of the basket assembly in the embodiment of FIG. 7. In this embodiment, the cylinders 118 and 120 do not adjust normal working depth of the tines 68. In the embodiment of FIGS. 1–6, the cylinders 118 and 120 support the basket assembly 14 as shown in FIG. 1 and can adjust the depth of the tines 68 when gathering rocks.

The disclosed embodiments are representative of a presently preferred forms of the invention, but is intended to be illustrative rather than definitive thereof. The invention is defined in the claims.

I claim:

1. A rock picker comprising a frame supported by wheels and having a tongue adapted to be attached to a tractor; a rock hopper supported by the frame; a basket assembly with a plurality of rock gathering tines and a grate having a receiving end and a discharge end; at least one short link pivotally attached to the frame and pivotal relative to the frame about a first axis, and pivotally attached to the basket assembly and pivotal relative to the basket assembly about a second axis; and at least one hydraulic cylinder connected to the basket assembly, for elevating rocks gathered by the rock gathering tines and depositing the rocks in the rock hopper.

2. A rock picker as set forth in claim 1 wherein the at least one hydraulic cylinder is also attached to a frame below the position in which the at least one short link is pivotally attached to the frame.

3. A rock picker as set forth in claim 1 wherein the at least one hydraulic cylinder is also pivotally attached to the at least one short link.

4. A rock picker as set forth in claim 3 wherein at least one basket support surface on the frame contacts the basket assembly to limit the depth of soil penetration by the rock gathering tines.

5. A rock picker as set forth in claim 1 including a second short link pivotally attached to the frame and to the basket assembly; a second hydraulic cylinder connected to the basket assembly; said at least one hydraulic cylinder is pivotally connected directly to the at least one short link; and said second hydraulic cylinder is pivotally connected directly to said second short link.

6. A rock picker comprising a frame supported by wheels and having a tongue adapted to be attached to a tractor; a rock hopper supported by the frame; a basket assembly with a plurality of rock gathering tines and a grate having a receiving end and a discharge end; at least one short link pivotally attached to the frame by a first pivot assembly and pivotally attached to the basket assembly by a second pivot assembly; and at least one hydraulic cylinder, for elevating rocks gathered by the rock hopper, attached to the frame and to the basket assembly.

7. A rock picker as set forth in claim 6 wherein the at least one short link has a first stop surface that contacts the frame to limit pivotal movement of the at least one short link in a first direction.

8. A rock picker as set forth in claim 7 wherein the at least one short link has a second stop surface that contacts the frame to limit pivotal movement of the at least one short link in a second direction.

9. A rock picker as set forth in claim 7 wherein at least one stop surface on the basket assembly contacts a basket support surface on the frame, to limit downward movement of the basket assembly relative to the frame, when the basket assembly is moved from a rock picking position and toward a rock discharge position.

10. A rock picker as set forth in claim 9 wherein initial activation of the at least one hydraulic cylinder, to elevate rocks gathers by the rock gathering tines, tends to pivot the at least one short link relative to the frame and lower a forward end of each of the rock gathering tines relative to an anchor end of each of the rock gathering tines.

11. A rock picker as set forth in claim 10 wherein continued activation of the at least one hydraulic cylinder, to elevate rocks gathered by the rock gathering tines, elevates the rock gathering tines to a position in which rocks slide on the grate toward said discharge end.

12. A rock picker as set forth in claim 9 wherein retraction of the at least one hydraulic cylinder moves the basket assembly to the rock picking position, with the at least one stop surface on the basket assembly spaced from the basket support surface on the frame, and the first stop surface on the at least one short link in contact with the frame.

13. A rock picker as set forth in claim 6 wherein the rock hopper is pivotally secured to the frame, the at least one hydraulic cylinder is pivotally attached to the rock hopper and the frame and moves the hopper relative to the frame between a loading position and an unloading position.

14. A rock picker as set forth in claim 6 wherein the grate of the basket assembly includes a plurality of spaced apart bars that allow soil to fall to the ground while rocks slide along the length of the plurality of spaced apart bars toward the discharge end of the grate.

15. A rock picker as set for in claim 14 wherein the length of the grate of the basket assembly from the receiving end to the discharge end is at least two times the length of the plurality of rock gathering times.

16. A rock picker as set forth in claim 14 wherein the basket assembly includes a pair of elongated side plates, a tine crossbar secured to the two elongated side plates, the plurality of rock gathering tines secured to the tine crossbar, the grate secured to the pair of elongated side plates and a yoke assembly with at least two yoke side plates secured to the pair of elongated side plates and extending forwardly from the pair of elongated side plates and a transverse member attached to an end of each of the yoke side plates that is furthest from the grate.

17. A rock picker comprising a frame supported by wheels and having a tongue adapted to be attached to a tractor; a rock hopper attached to the frame; a basket assembly with a plurality of rock gathering tines, each having a forward end, and a grate having a rock receiving end and a rock discharge end; a first short link and a second short link each of which is pivotally attached to the frame for pivotal movement about a short link axis and to the basket assembly and has a first short link stop surface that contacts the frame to limit pivotal movement of the first and second short links in a first direction; a first hydraulic cylinder pivotally attached to the basket assembly and pivotally secured to the frame for pivotal movement about a cylinder axis, a second hydraulic cylinder pivotally attached to the basket assembly and pivotally secured to the frame for pivotal movement about the cylinder axis, and wherein the first and second hydraulic cylinders bias the first short link stop surface on the first and second short links toward contact with the frame when the first and second hydraulic cylinders are retracted; and wherein extension of the first and second hydraulic cylinders frees the first short link stop surface on the first and second short links to move from contact with the frame, and frees the forward end of each of the rock gathering tines to move downward.

18. A rock picker as set forth in claim 17 including a basket assembly stop surface on the basket assembly that cooperates with a basket support surface on the frame to limit downward movement of the plurality of rock gathering tines relative to the frame.

19. A rock picker as set forth in claim 17 including a second short link stop surface on the first short link and the second short link that contacts the frame to limit pivotal movement of the first and second short links in a second direction.

20. A method of picking rocks from a field with a rock picker having a frame supported by wheels and adapted to be attached to a tractor, a basket assembly with rock gathering tines each having a forward pointed end and a rear anchor end and a grate with a rock receiving end and a rock discharge end, a short link pivotally attached to the frame and to the basket assembly and a first short link stop surface on the short link, comprising the steps of: pivoting the short link relative to the frame until the first short link stop surface contacts the frame, the forward pointed ends of the rock gathering tines are down in the ground and the basket assembly is biased toward a rock gathering position; moving the rock gathering tines forward to gather rocks while allowing soil and small rocks to pass between the rock gathering tines; freeing the short link to pivot relative to the frame, lower the forward pointed ends of the rock gathering tines relative to their rear anchor ends and urge the rock gathering tines downward; pivoting the basket assembly relative to the frame to first move the rock gathering tines forward through the soil and then lift the rock gathering tines and any rocks held by the assembly; separating soil from the rocks as the rocks slide from the rock gathering tines on the grate; discharging rocks from the discharge end of the grate; and returning the basket assembly to the rock gathering position.

21. A rock picker comprising a frame supported by wheels and having a tongue adapted to be attached to a tractor; a rock hopper supported by the frame; a basket assembly with a plurality of rock gathering tines and a grate having a receiving end and a discharge end; at least one short link pivotally attached to the frame and to the basket assembly; at least one hydraulic cylinder connected to the basket assembly, for elevating rocks gathered by the rock gathering tines and depositing the rocks in the rock hopper; a second short link pivotally attached to the frame and to the basket assembly; a second hydraulic cylinder connected to the basket assembly; and said at least one hydraulic cylinder is pivotally connected directly to said short link; and said second hydraulic cylinder is pivotally connected directly to second short link.

22. A rock picker comprising a frame supported by wheels and having a tongue adapted to be attached to a tractor; a rock hopper supported by the frame; a basket assembly with a plurality of rock gathering tines and a grate having a receiving end and a discharge end; at least one short link pivotally attached to the frame and to the basket assembly; at least one hydraulic cylinder connected to the basket assembly, for elevating rocks gathered by the rock gathering tines and depositing the rocks in the rock hopper; and wherein the at least one hydraulic cylinder is also attached to the frame below a position in which at least one short link is pivotally attached to the frame.

23. A rock picker comprising a frame supported by wheels and having a tongue adapted to be attached to a tractor; a rock hopper supported by the frame; a basket assembly with a plurality of rock gathering tines and a grate having a receiving end and a discharge end; at least one short link pivotally attached to the frame and to the basket assembly; at least one hydraulic cylinder, for elevating rocks gathered by the rock gathering tines and depositing rocks in the rock hopper, attached to the frame and to the basket assembly; and wherein the at least one short link has a first stop surface that contacts the frame to limit pivotal movement of the at least one short link in a first direction.

\* \* \* \* \*